United States Patent
Gute

[19]

[11] Patent Number: 5,871,252
[45] Date of Patent: Feb. 16, 1999

[54] TELESCOPIC SUNVISOR

[75] Inventor: Robert M. Gute, Frankfort, Mich.

[73] Assignee: Lear Corporation, Southfield, Mich.

[21] Appl. No.: 688,430

[22] Filed: Jul. 30, 1996

[51] Int. Cl.[6] .................................................. B60J 3/02
[52] U.S. Cl. ...................................... 276/97.11; 276/97.9
[58] Field of Search .................................. 296/97.1, 97.9, 296/97.11–97.13

[56] References Cited

U.S. PATENT DOCUMENTS

| | | | |
|---|---|---|---|
| 1,633,190 | 6/1927 | Rader | 296/97.9 |
| 2,201,377 | 5/1940 | Schoenheit . | |
| 4,617,699 | 10/1986 | Nakamura | 296/97.9 X |
| 4,858,983 | 8/1989 | White et al. | 296/97.13 |
| 4,921,300 | 5/1990 | Lawassani et al. | 296/97.11 |
| 4,925,233 | 5/1990 | Clark | 296/97.11 |
| 4,998,765 | 3/1991 | Van Order et al. | 296/97.11 |
| 5,080,420 | 1/1992 | Hemmeke et al. | 296/97.1 |
| 5,251,949 | 10/1993 | Miller et al. | 296/97.12 |
| 5,280,988 | 1/1994 | Gute | 296/97.12 X |

*Primary Examiner*—Dennis H. Pedder
*Attorney, Agent, or Firm*—Brooks & Kushman P.C.

[57] ABSTRACT

A telescopic sunvisor is disclosed which includes a support arm and a panel which is telescopically mounted on the panel. The support arm has a deployment flat and preferably a stow flat peripherally spaced from the deployment flat. The panel has a core, a retainer or channel which supports the core, and a detent spring assembly or clamp which engages the support arm. The detent spring assembly has a pair of opposing legs which clamp about the support arm. Ideally, the detent spring assembly is made of two opposing U-shaped clips which interlock with one another about the support arm. The detent spring assembly and panel may be selectively rotated about the support arm between stowed and deployed positions. In the deployed position, the detent spring clamps about the deployment flat while allowing sliding movement therebetween such that the panel may be telescopic moved relative to the support arm.

13 Claims, 4 Drawing Sheets

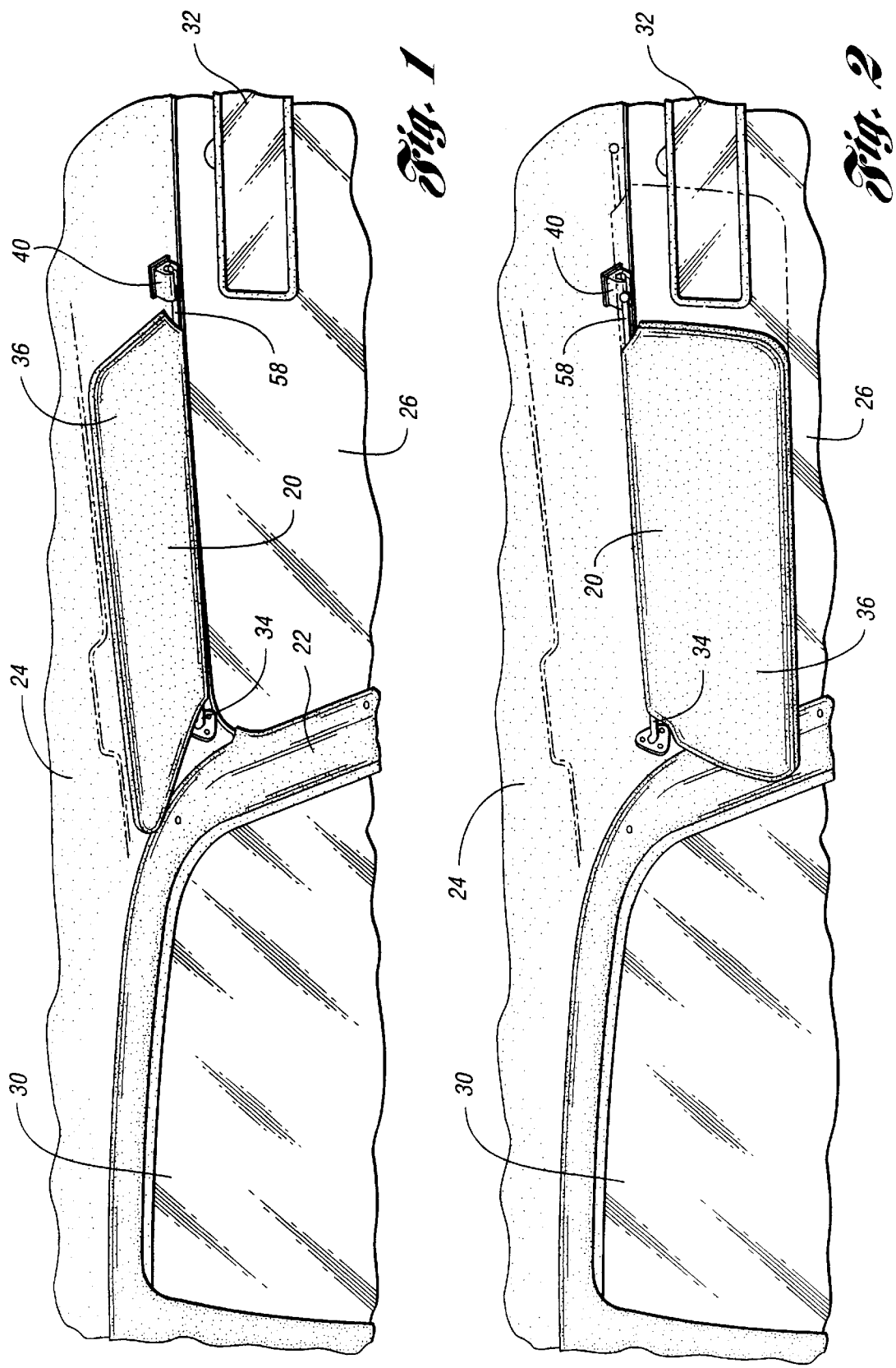

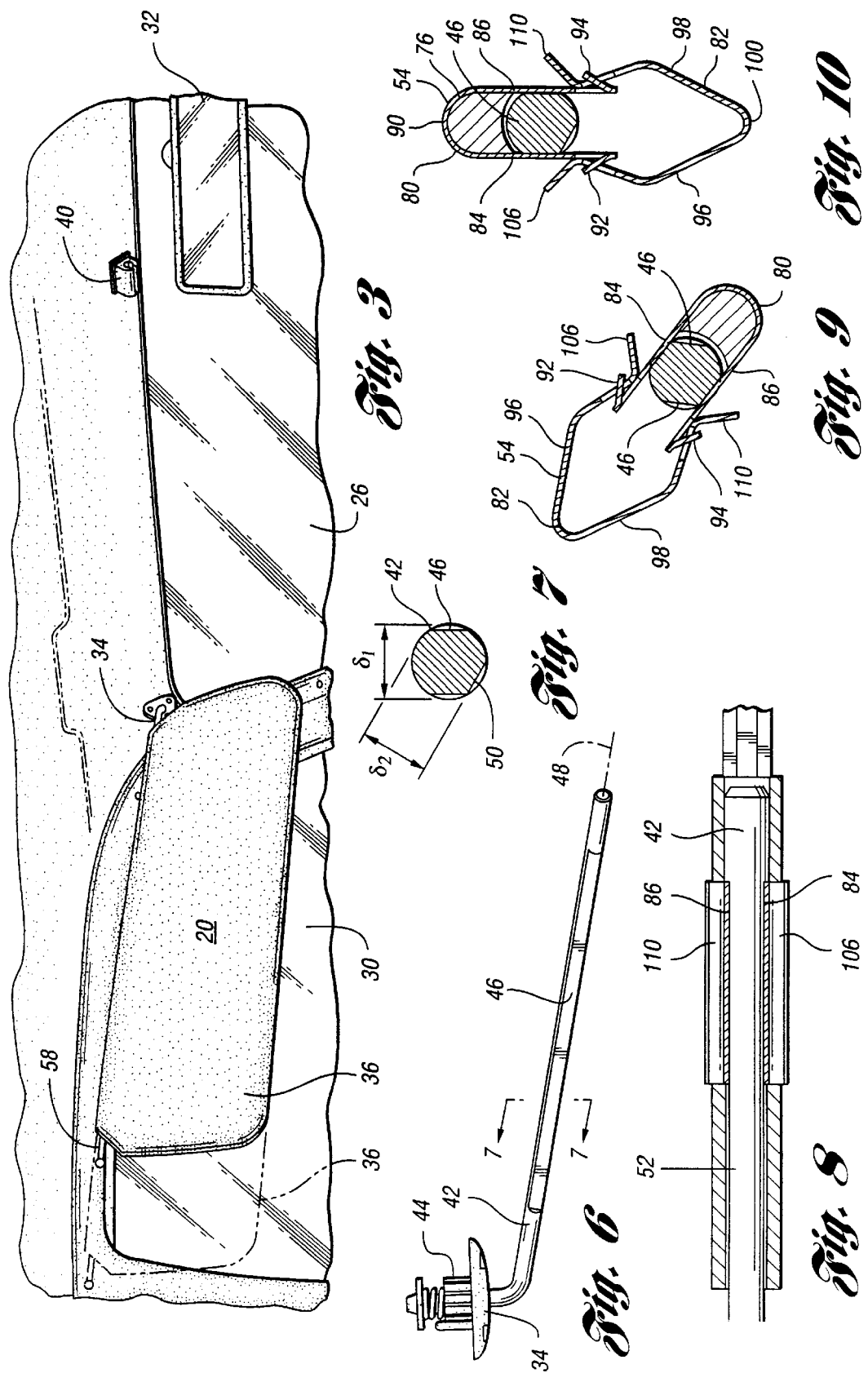

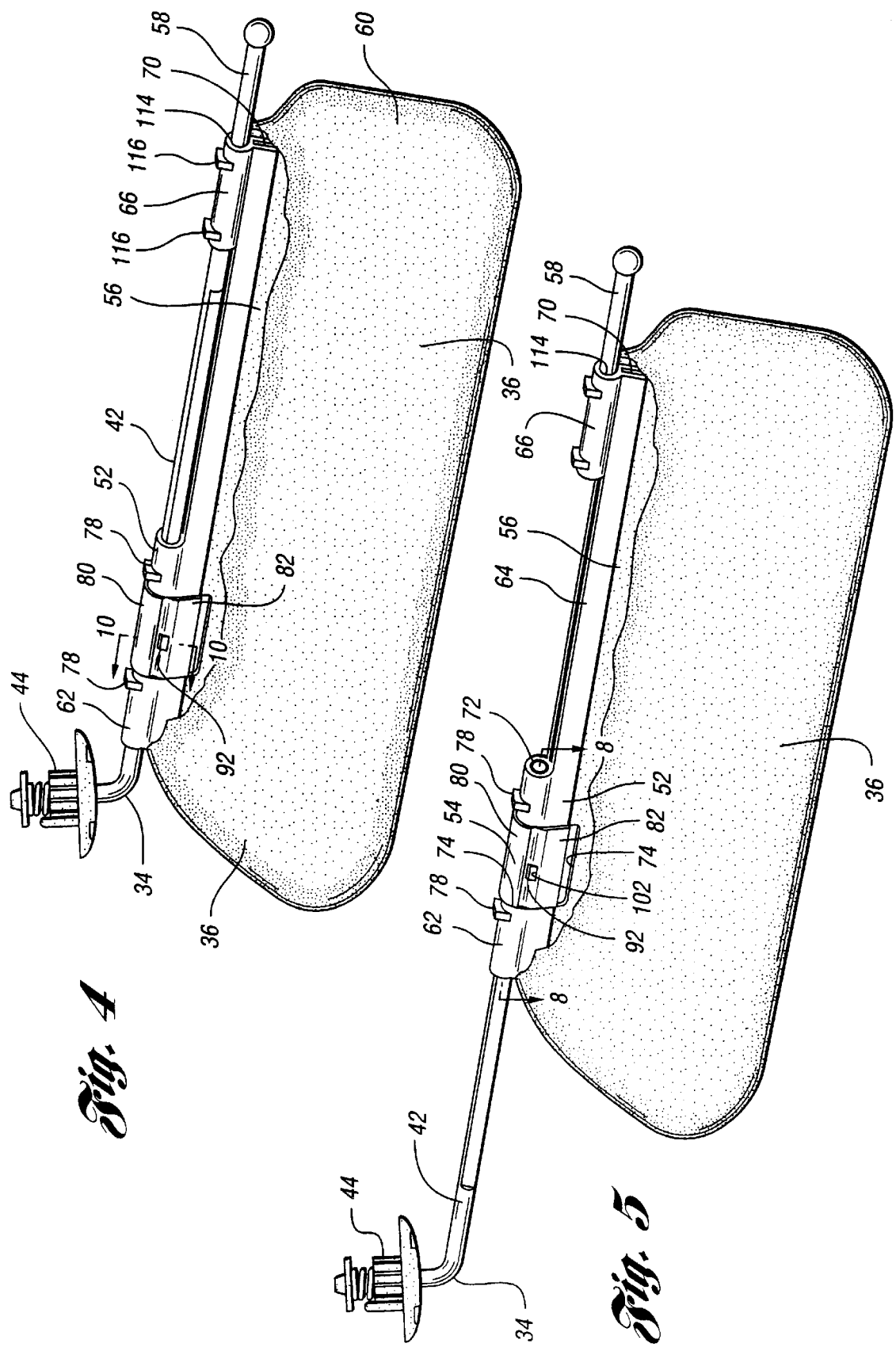

5,871,252

TELESCOPIC SUNVISOR

TECHNICAL FIELD

This invention relates to telescopic sunvisors for vehicles which have panels or visors telescopically positionable along respective support arms.

BACKGROUND ART

Sunvisors for vehicles which have panels or visors slidably or telescopically mounted on support arms are known. An early example of such a sunvisor is found in Schoenheit, U.S. Pat. No. 2,201,377. This particular sunvisor uses a simply supported leaf spring on a panel to engage a support arm thus positioning the panel relative to the support arm. When the leaf spring engages an intermediate flat on the support arm, the panel is easily slid longitudinally along the support arm. However, when the panel is rotated such that the leaf spring engages a cylindrical rather than flat portion of the support arm, sufficient frictional engagement is created between the leaf spring and the support arm to prevent sliding movement therebetween and consequently between the panel and the support arm.

Another example is found in Clark, U.S. Pat. No. 4,925,233, which requires a pair of longitudinally spaced apart pivot blocks which interact with a support arm and a pair of guide rods. The pivot blocks have apertures therein which frictionally engage the guide rods to limit the sliding of a panel upon the support arm.

However, both sunvisors are relatively complicated and expensive to manufacture. Further, both sunvisors fail to provide provisions for stably biasing the sunvisor to both stowed and deployed positions using a relative simply design.

SUMMARY OF THE INVENTION

It is an object of the present invention to provide a sunvisor which is simpler in construction and easier to assembly than conventional telescopic sunvisors.

It is another object to provide a telescopic sunvisor which has a support arm with peripherally spaced apart flats which cooperate with a clamp or detent spring assembly on a panel to stably and selectively position the sunvisor in either a deployed or stowed position.

It is yet another object to provide a sunvisor having a detent spring assembly comprising a pair of opposing and interlocking U-shaped clips which clamp about flats of a support arm to selectively and telescopically mount a panel to the support arm wherein only small differences in cross-sectional thickness of the support arm result in relatively large differences in clamping forces created between the detent spring assembly and the support arm.

In accomplishing these and other objects, the present invention provides for a telescopic sunvisor having a support arm and a panel. The support arm has a first flat and preferably a second flat peripherally spaced from the first flat. The panel has a core and at least one mounting retainer or channel securing to the core and further includes a detent spring assembly having spaced apart first and second legs which stably and slidably clamp about the first flat of the support arm in a first deployed position. Ideally, the detent spring assembly stably clamps about a second flat on the support arm in a second stowed position. The panel may be rotated between the stowed and deployed positions relative to the support arm with the panel being slidable relative to the support arm in at least one of the stowed and deployed positions. The detent spring assembly or clamp preferably includes a pair of U-shaped opposed and interlocking clips which clamp about the support arm.

BRIEF DESCRIPTION OF THE DRAWINGS

These and other features, objects and advantages of the present invention will become readily apparent from the following description, pending claims, and accompanying sheets of drawings where:

FIG. 1 is a fragmentary perspective view of a sunvisor, made in accordance with the, present invention, in a retracted and stowed position within a vehicle;

FIG. 2 is a fragmentary perspective view of a sunvisor in a retracted and deployed position, and in phantom, in a deployed and extended position;

FIG. 3 is a fragmentary perspective view of the sunvisor pivoted and deployed to cover a portion of the vehicle's driver side window, and in phantom, in an extended and deployed position;

FIG. 4 is a perspective view of the sunvisor in a retracted/deployed position with a portion of a panel covering cut away;

FIG. 5 is a perspective view of the sunvisor shown in a deployed/extended position with a portion of the panel covering cut away;

FIG. 6 is a perspective view of an arm assembly including an elongate support arm;

FIG. 7 is a sectional view of the support arm taken along line 7—7 of FIG. 6;

FIG. 8 is an enlarged fragmentary sectional view taken along line 8—8 of FIG. 5;

FIG. 9 is a sectional view of a detent spring assembly clamping about the support arm including a stow flat;

FIG. 10 is a sectional view taken along line 10—10 of FIG. 4 of the detent spring assembly clamping against a pair of diametrically opposed deployment flats on the support arm;

BEST MODE FOR CARRYING OUT THE INVENTION

Figure 11:
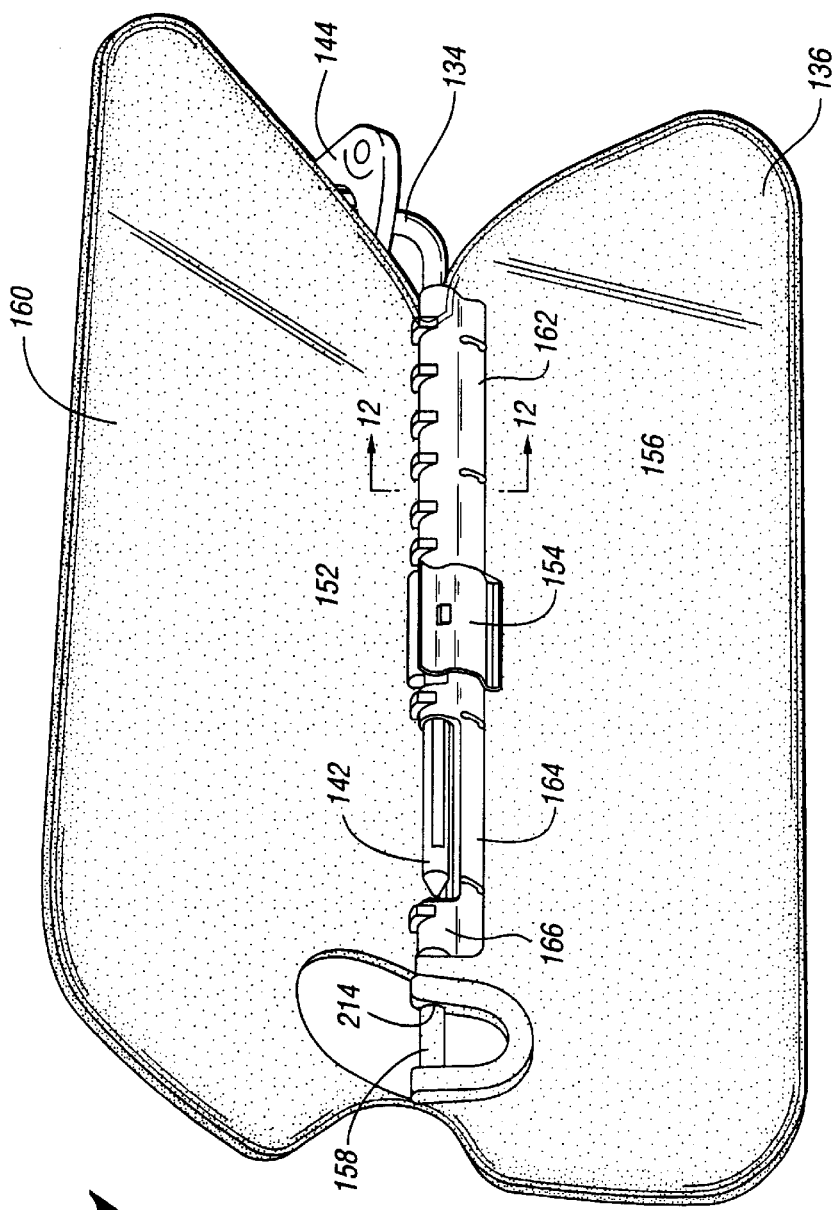
FIG. 11 is a perspective view of a second embodiment of a telescopic sunvisor with an open covering exposing a core, a channel and a centrally located detent spring assembly and an inboard located visor end support.

FIG. 1 illustrates a sunvisor 20, made in accordance with the present invention, which is pivotally mounted within a vehicle 22. Sunvisor 20 is used to block sunlight from a vehicle passenger's eyes. As shown in FIG. 1, sunvisor 20 is disposed in a retracted and stowed position adjacent a headliner 24 of vehicle 22. Also illustrated in FIG. 1 is a windshield 26, a driver's side window 30 and a rear view mirror 32.

Sunvisor 20 includes an arm assembly 34 and a panel 36 which telescopically mounts on arm assembly 34. Sunvisor 20 can be placed in various positions relative to the vehicle passenger compartment. In FIG. 1, panel 36 is positioned in a retracted and stowed position abutting against the underside of headliner 24. A retaining clip 40, affixed to headliner 24, is used to releasably capture a free end of panel 36. In FIG. 2, panel 36 is shown in a retracted and deployed position in full line, and in phantom, in an extended and deployed position partially covering rear view mirror 32.

Panel 36 is unclipped from retaining clip 40 to allow sunvisor 20 to be telescopically extended. Sunvisor 20 is shown in FIG. 3 in a retracted and deployed position pivoted to cover a portion of driver's side window 30. In phantom line, sunvisor 20 is shown in an extended position. Sunvisor 20 could also be mounted on the passenger's side of vehicle 22.

Arm assembly 34, as best seen in FIG. 6, includes a L-shaped support arm 42 which is pivotally connected to a conventional stay assembly 44. Stabs assembly 44 affixes to headliner 24 and allows support arm 42 to pivot relative to headliner 24. Support arm 42 is generally circular in cross-section and extends along a longitudinal axis 48. Ideally, support arm 42 includes a pair of diametrically opposed deployment flats 46 and, peripherally spaced therefrom, a single stow flat 50, as seen in FIG. 7. Flats 46 and 50 extend the majority of the longitudinal length of support arm 42.

Referring to FIGS. 4 and 5, panel 36 is shown mounted upon arm assembly 34. In FIG. 4, panel 36 is in a retracted and deployed position and FIG. 5 is shown in a deployed and extended position. Panel 36 comprises a channel 52, a detent spring assembly 54 which serves as a clamp, a core 56, an end pin 58 and a covering 60. Channel 52 retains core 56. Detent spring assembly 54 clamps about channel 52 and support arm 42 to position panel 36 relative to arm assembly 34. End pin 58 is held within an end of channel 52. Finally, a covering 60 envelops core 56, channel 52 and detent spring assembly 54. Covering 60 is preferably made of cloth with a foam liner and is sewn, vibration welded or otherwise closed about core 56 and channel 52.

Channel 52 includes a proximate portion 62, an open intermediate portion 64 and a distal portion 66. An elongate groove 70 extends the length of telescopic channel 52 as part of proximate, intermediate and distal portions 62, 64 and 66. Core 56, which is generally planar, is clampingly retained within groove 70. Although not shown, core 56 is preferably stapled or otherwise fastened to channel 52 as well.

Proximate portion 62 includes a bore 72 through which support arm 42 extends. Bore 72 is smooth and slightly oversized relative to support arm 42 so that support arm 42 readily slides through bore 72. Proximate portion 62 also includes a detent spring opening 74 in which detent spring assembly 54 is disposed. A bridge 76 extends across the top of detent spring assembly 54, as indicated in FIG. 10. A pair of nubbins 78 are disposed on either side of opening 74 and detent spring assembly 54. Bridge 76 extends between nubbins 78.

Detent spring assembly 54 is best seen in FIGS. 4–5 and 8–10. Detent spring assembly 54 includes an inverted U-shaped upper detent clip 80 and a generally U-shaped lower detent receiving clip 82. Upper detent clip 80 includes first and second legs 84 and 86 connected by a bight portion 90. Located mid-length along legs 84 and 86 are outboard protruding retaining ears 92 and 94. Receiver clip 82 includes first and second leg portions 96 and 98 which are connected by a bight portion 100. Each of legs 92 and 94 have retainer openings 102 and 104. At the upper end of legs 96 and 98 are outwardly tapered end portions 106 and 110. To assemble detent spring assembly 54 about support arm 42.

Receiver clip 82 is then placed through detent spring opening 74 with legs 96 and 98 being aligned so that they extend upwardly. Next, upper detent clip 80 is placed over bridge 76 and slid downwardly between end portions 106 and 110 of legs 96 and 98 until retaining ears 92 and 94 snap through respective retainer openings 102 and 104. Thus, detent spring assembly 54 is clamped about bridge 76 and support arm 42 as seen in FIGS. 9 and 10.

Distal end portion 66 of channel 52 includes a retaining bore 114 (FIGS. 4 and 5) into which end pin 58 is press-fit. End pin 58 is releasably retained within retaining clip 40 located on headliner 24 of vehicle 22 when sunvisor 20 is in a stowed and retracted position. A pair of nubbins 116 are disposed atop distal portion 66. Nubbins 78 and 116 provide spacing when covering 36 is closed over core 56, telescopic channel 52 and detent spring assembly 54. Covering 36 is shown enclosing the remainder of panel 36 in FIGS. 1 and 2.

Referring back to FIG. 7, support arm 42 is generally circular in cross-section having a diameter of approximately 0.3125 inch. A clamping distance $\delta_1$ between diametrically opposed flats 46 provides a minimal cross-sectional distance across support arm 42. In this preferred exemplary embodiment, $\delta_1 = 0.272$ inch. A second minimal clamping distance $\delta_2$ is defined between a tangent to the outer surface of support arm 42 and flat 50. The distance $\delta_2$ in this preferred exemplary embodiment is 0.300".

Panel 36 is held in a stable deployed position when legs 84 and 86 of detent spring assembly 54 are clamped about diametrically opposed flats 46, as seen in FIG. 10. Similarly, panel 36 is stably held in a stowed position when legs 84 and 86 clamp about flat 50 and the diametrically opposed arcuate surface on support arm 42, as shown in FIG. 9. By grasping panel 36 and rotating panel 36 about the longitudinal arm 48 of support arm 42, panel 36 can be selectively positioned between the deployed and stowed positions.

The interlock of upper detent clip 80 with receiver clip 82 provides a clamping force between detent spring assembly 54 and support arm 42. The smallest clamping force between detent spring assembly 54 and support arm 42 occurs when detent spring assembly 54 clamps against flats 46 thereby separating legs 84 and 86 by distance $\delta$, or 0.272 inch. This minimal clamping force allows detent spring assembly 54 to be readily slid upon support arm 42 by a vehicle passenger when in the deployed position. When sunvisor 20 is in the stowed position, detent spring assembly 54 grasps support arm 42 with significantly more clamping force such that panel 36 does not readily slide upon support arm 42. When legs 84 and 86 are not engaged with either of flats 46 or flat 50, the clamping force provided by detent spring assembly 54 upon opposing arcuate surfaces is at a maximum. Accordingly, detent spring assembly 54 seeks to snap into a stable, lower clamping force position such as those provided in either the deployed or stowed positions.

FIG. 11 shows a second embodiment of a telescopic sunvisor 120. Sunvisor 120 includes an arm assembly 134 and a panel 136. Arm assembly 134 has a stay assembly 144 similar to stay assembly 44 of the first embodiment and is affixable to a vehicle headliner.

Figure 12:
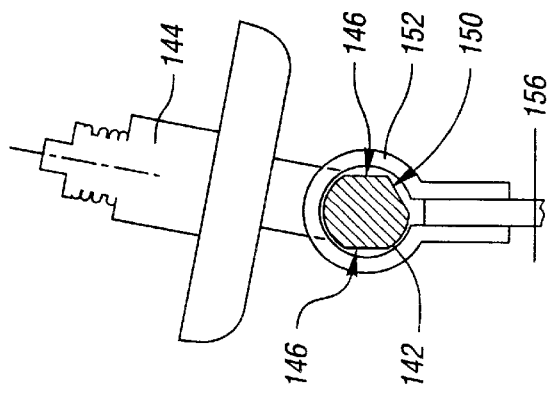
FIG. 12 is a fragmentary sectional view taken along line 12—12 of FIG. 11.

Arm assembly 134 also includes an elongate support arm 142 with deployment and stow flats 146 and 150. (See FIG. 12). Panel 136 includes a channel 152, a detent spring assembly 154, a core 156, a mounting rod 158 and a covering 160. Sunvisor 120 is shown in the retracted position however it is telescopic when in the deployed position. Channel 152 has proximate portion 162, an intermediate portion 164 and a distal portion 166. FIG. 12 illustrates channel 152 clamping about core 156. Mounting rod 158 is integrally molded to bracket 214 and is assembled to core 156. Detent spring assembly 154, which is generally identical to detent spring assembly 54, is slidable upon support arm 142 when in a deployed position. Detent spring assembly 154 engages the pair of deployment flats 146 to accommodate the telescopic movement of panel 136 relative to arm assembly 134. When in the stowed position, preferably panel 136 is not slidable upon arm 142.

An advantage telescopic sunvisor 120 has relative to sunvisor 20 is that detent spring assembly 154 is positioned near the center rather than near the end of panel 136 adjacent stay assembly 144. Accordingly, when a vehicle occupant grasps panel 136 at its center, panel 136 will easily rotate about the longitudinal axis of support arm 142 because the occupant is pulling or pushing upon panel 136 in a plane aligned with detent spring assembly 154.

Another advantage of having the detent spring assembly 154 centrally located in core 136 is to allow the detent spring 154 and arm 134 to be lubricated and not have the lubricant exposed to the vehicle occupants when the visor is deployed and extended. The portion of the support arm 134 lubricated by detent spring 154 remains within channel 152.

While in the foregoing specification this invention has been described in relation to a certain preferred embodiment thereof, and many details have been set forth for the purpose of illustration, it will be apparent to those skilled in the art that the invention is susceptible to alteration and that certain other details described herein can vary considerably without departing from the basic principles of the invention.

What is claimed is:

1. A telescopic sunvisor for mounting to a vehicle headliner, the sunvisor comprising:

an elongate support arm having a first deployment flat and a second stow flat peripherally spaced from the first flat; and a panel including a core, at least one mounting retainer including a channel disposed about the core, and a clamp attached to the mounting retainer, the clamp having spaced apart first and second legs which stably and slidably clamp about the support arm including the first deployment flat in a first deployed position when the sunvisor is mounted to the vehicle headliner and which stably clamps about the arm including the second stow flat in a second stowed position;

wherein the panel may be selectively and stably positioned between the stowed and deployed positions relative to the support arm with the panel being readily slidable along the support arm in at least one of the stowed and deployed positions.

2. The telescopic sunvisor of claim 1 wherein:

the clamping distance across the arm including the first flat is less than the clamping distance across the arm including the second flat; and the panel is readily slidably along the support arm when in the deployed position.

3. The telescopic sunvisor of claim 1 wherein:

the clamp includes first and second clips which interlock with one another about the support arm to provide a clamping force about the support arm.

4. The telescopic sunvisor of claim 3 wherein:

the first clip includes the first and second legs and the second clip has third and fourth legs, the third and fourth legs respectively cooperatively engaging with the first and second legs to enhance the clamping stiffness of the first clip.

5. The telescopic sunvisor of claim 4 wherein:

the first and second clips have respective retaining ears and openings which interlock with one another to hold the clamp together about the support arm.

6. The telescopic sunvisor of claim 4 wherein:

the first and second clips oppose one another with the legs overlapping to provide the clamp with a generally oval shape.

7. The telescopic sunvisor of claim 1 wherein:

the support arm includes a second deployment flat diametrically opposed to the first deployment flat.

8. The telescopic sunvisor of claim 1 wherein:

the mounting retainer has an access opening therein through which clamp mounts to the support arm.

9. The telescopic sunvisor of claim 8 wherein:

the access opening in the mounting retainer is disposed midlength along the mounting retainer.

10. The telescopic sunvisor of claim 1 wherein:

the mounting retainer has a mounting bore which slidably supports the support arm.

11. A telescopic sunvisor comprising:

an elongate support arm having a first deployment flat; and a panel including a core, at least one mounting retainer secured to the core, and a clamp attached to the retainer, the clamp having a first clip having spaced apart first and second legs and a second clip having third and fourth legs which interlock with the first and second legs to stiffen the clamp, the first and second legs stably and slidably exerting a first clamping force about the support arm including the first deployment flat in a first deployed position and exerting a second clamping force greater than the first clamping force about the support arm in a second stowed position;

wherein the panel may be snapped between the stowed and deployed positions relative to the support arm with the panel being slidable relative to the support arm when in the deployed position.

12. The telescopic sunvisor of claim 11 wherein:

the support arm has a second stow flat peripherally spaced from the first deployment flat, the first and second legs of the clamp clamping about the support arm including the second stow flat when the panel is in the stowed position.

13. A telescopic sunvisor comprising:

an elongate mounting arm having a first pair of diametrical opposed deployment flats and a second flat peripherally spaced from the first deployment flats; and a panel including a core, at least one mounting retainer including a channel disposed about the core and, a clamp attached to the retainer, the clamp including first and second opposing clips which interlock with one another to slidably clamp about the first pair of deployment flats in a first deployed position and which stably clamp about the support arm including the second stow flat in a second stowed position;

wherein the panel may be selectively and stably positioned in the stowed and deployed positions relative to the support arm with the panel being slidable relative to the support arm in at least one of the stowed and deployed positions.

* * * * *